Nov. 7, 1961     W. G. PASCUCCI     3,007,609
DRINK DISPENSER

Filed Dec. 10, 1959                              5 Sheets-Sheet 1

INVENTOR.
William G. Pascucci,
BY Paul & Paul
ATTORNEYS.

Nov. 7, 1961 W. G. PASCUCCI 3,007,609
DRINK DISPENSER
Filed Dec. 10, 1959 5 Sheets-Sheet 4

INVENTOR.
William G. Pascucci,
BY Paul & Paul
ATTORNEYS.

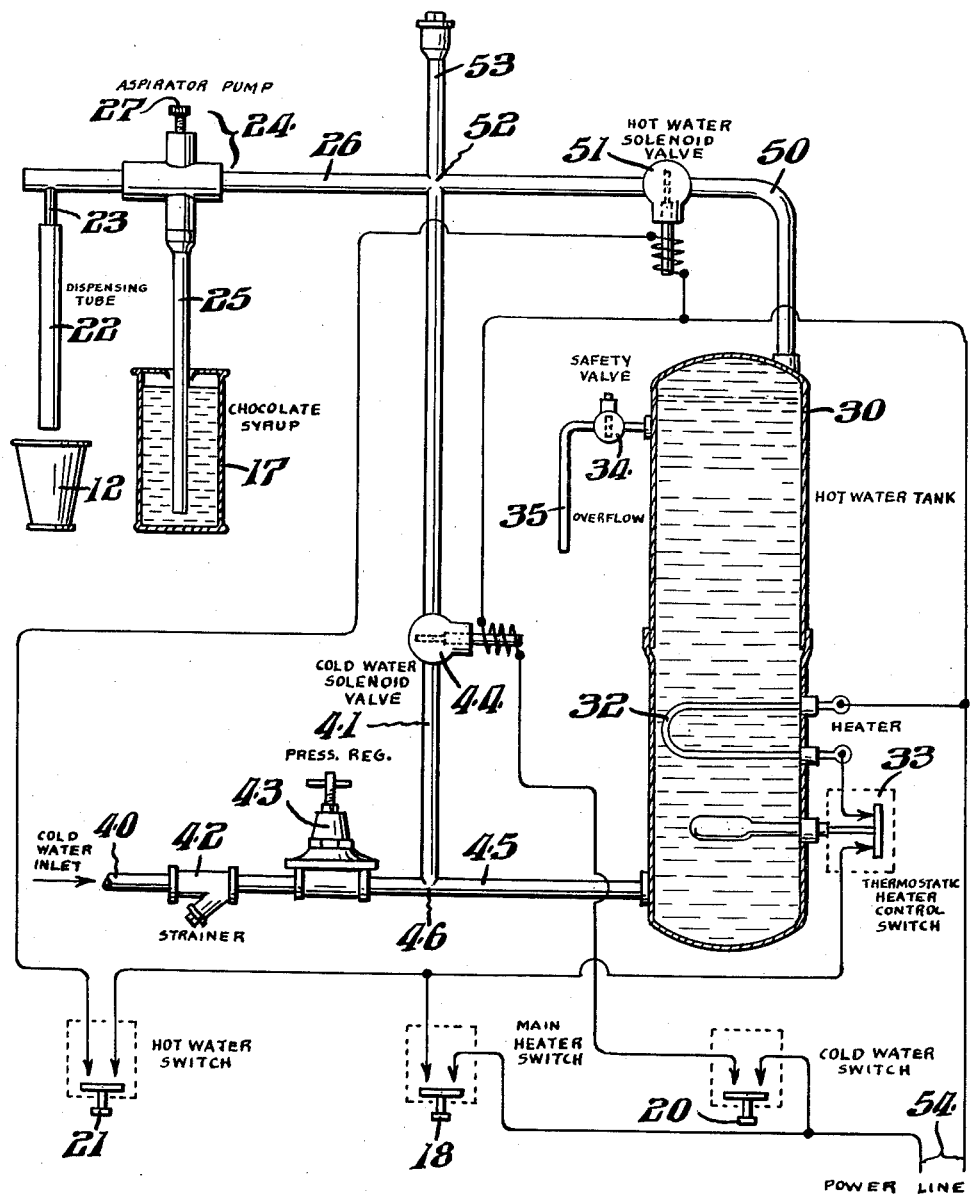

3,007,609
DRINK DISPENSER
William G. Pascucci, Pottstown, Pa., assignor to Parker Service Co., Philadelphia, Pa., a partnership
Filed Dec. 10, 1959, Ser. No. 858,768
5 Claims. (Cl. 222—129.2)

This invention relates to a drink dispenser and more particularly to a drink dispenser which selectively combines hot or cold water with a concentrated flavoring material.

The invention is specifically directed to a dispenser for a mixed chocolate drink in which a chocolate syrup concentrate is mixed with either hot or cold water in predetermined proportions.

It is an object of this invention to provide a drink dispenser which utilizes ordinary tap water at a controlled pressure and a controlled temperature and mixes the water automatically with a flavored concentrate in a predetermined proportion to provide a fresh mixed drink wherein either hot or cold water is automatically selectively used.

Other objects and advantages will be apparent from the following description and the drawings wherein:

FIG. 6 is a schematic diagram showing the hydraulic and electrical circuits of the drink dispenser of FIG. 1.

Figure 1:
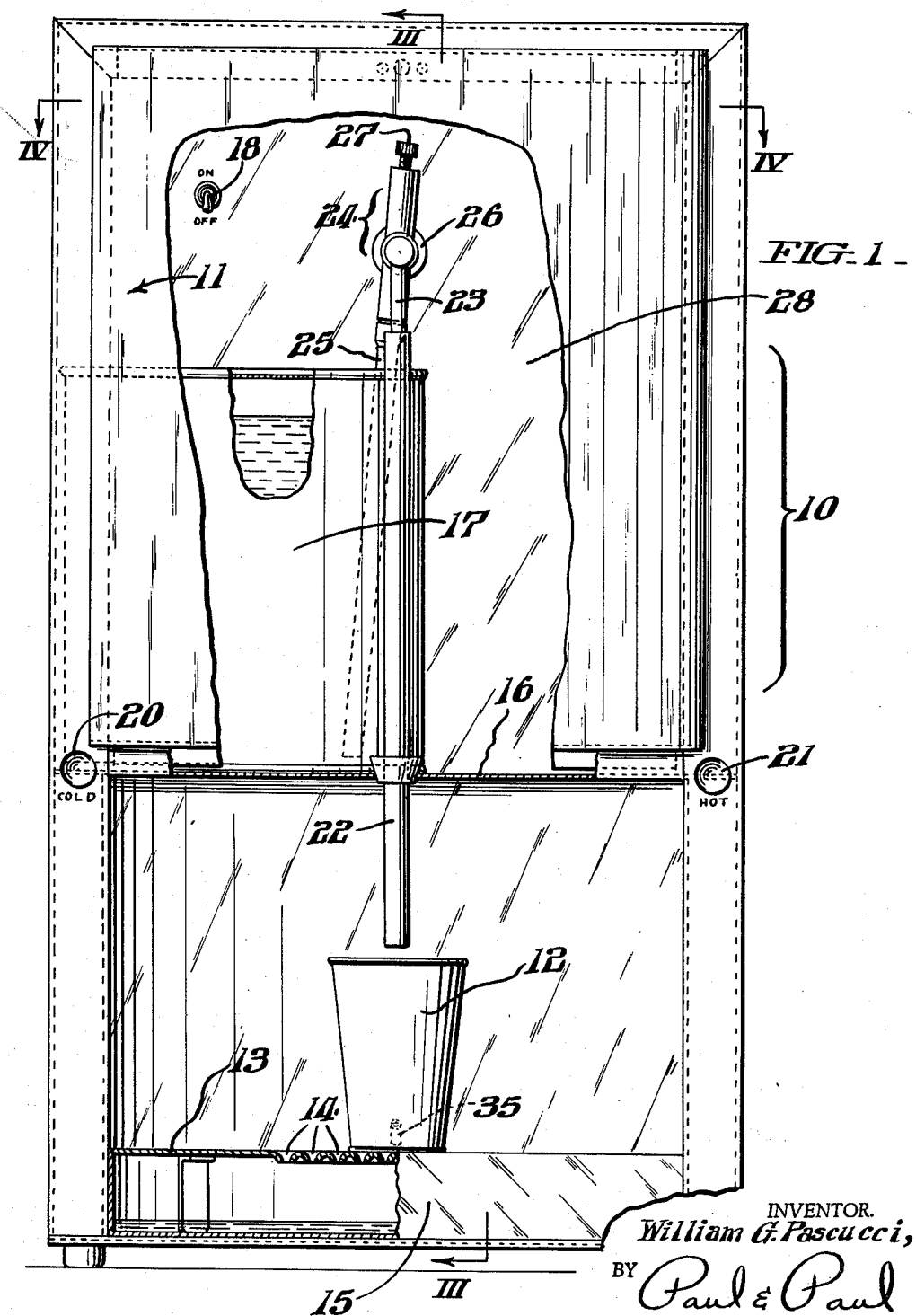
FIG. 1 is a front elevational view partly broken away of a drink dispenser made according to the invention.

In describing the preferred embodiment of the invention illustrated in the drawing, specific terminology has been resorted to for the sake of clarity. However, it is not the intention to be limited to the specific terms so selected and it is to be understood that each specific term includes all technical equivalents which operate in a similar manner to accomplish a similar purpose.

A drink dispenser made according to the invention is illustrated in FIG. 1. The entire unit is mounted within cabinet 10. The upper portion of cabinet 10 is enclosed at the front by means of removable shield 11. The lower portion of cabinet 10 is open to accommodate a drinking vessel 12 which may be positioned on a drain plate 13. The drain plate 13 is provided with openings 14 permitting overflow liquid to drop into the removable overflow pan 15. The upper portion of cabinet 10 is provided with a floor 16 upon which a standard container 17 for a syrup concentrate may be disposed. A master control switch 18 is located on the back wall of the upper portion of cabinet 10 and actuating switches 20 and 21 are disposed on the front side edges of cabinet 10. In the embodiment illustrated, button 20 produces a cold drink and button 21 a hot drink. The final mixed drink is discharged into the receptacle 12 from dispensing tube 22 which is mounted in the floor 16 of the upper portion of cabinet 10. The mixed drink is fed into dispensing tube 22 from tube 23 which is mounted on the end of aspirator pump 24. Aspirator pump 24 draws the flavored concentrate from container 17 through syrup tube 25. The water is fed into aspirator pump 24 from water line 26. The ratio of water to syrup is controlled through control screw 27 as will be hereinafter more fully described.

Figure 2:
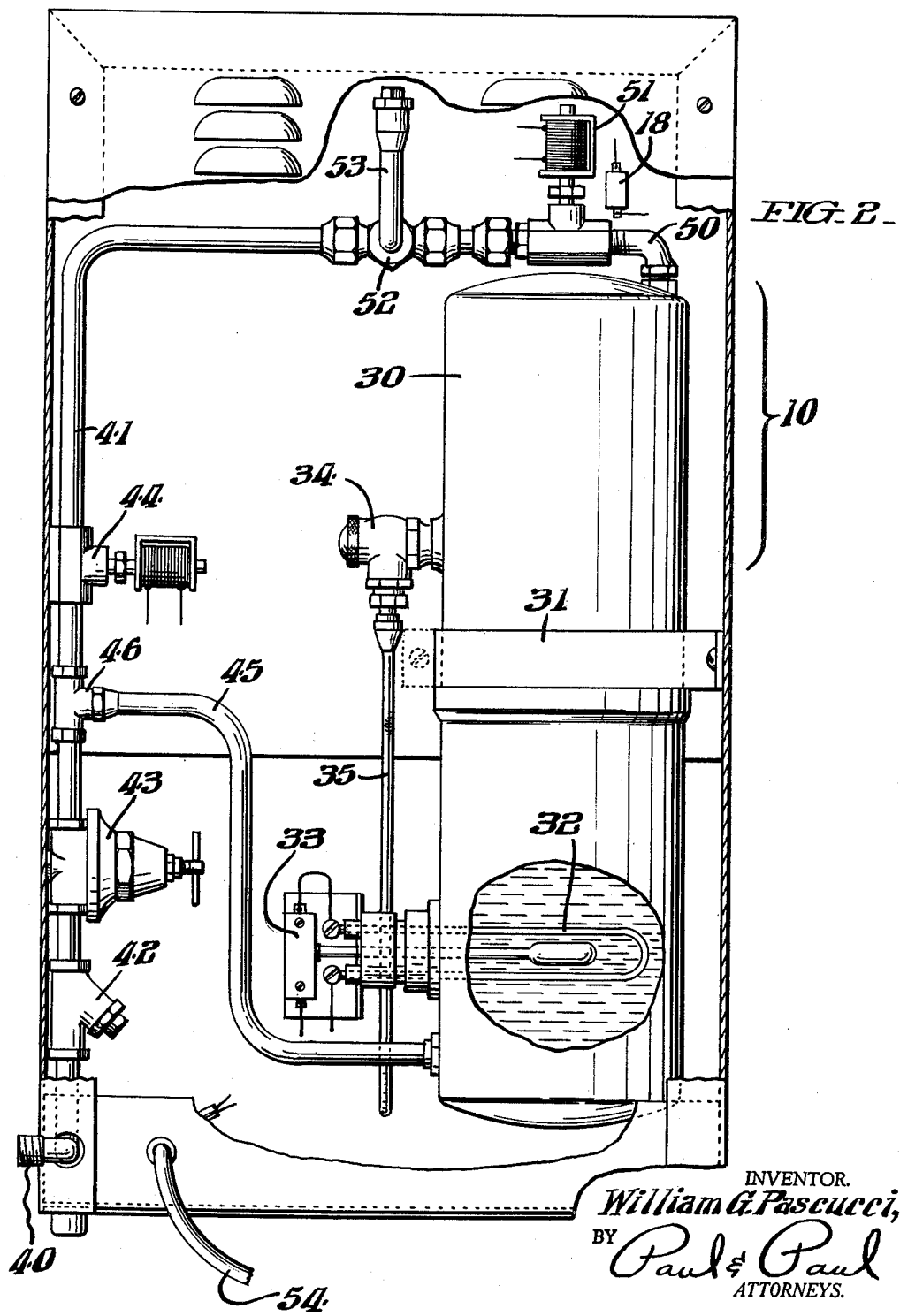
FIG. 2 is a rear elevational view partly broken away of the drink dispenser of FIG. 1.
Figure 3:
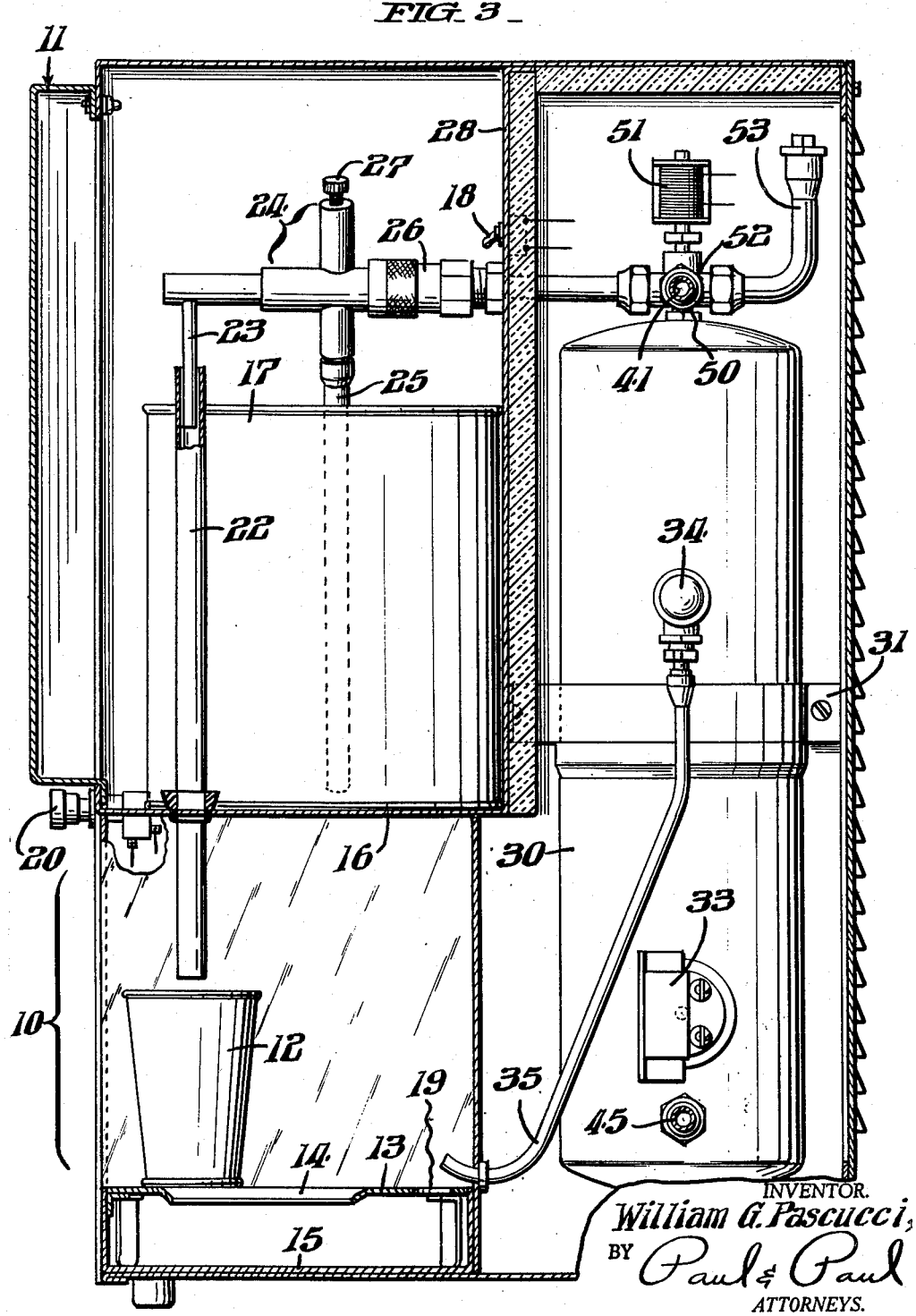
FIG. 3 is a cross sectional view partly broken away along the line III—III of FIG. 1.
Figure 4:
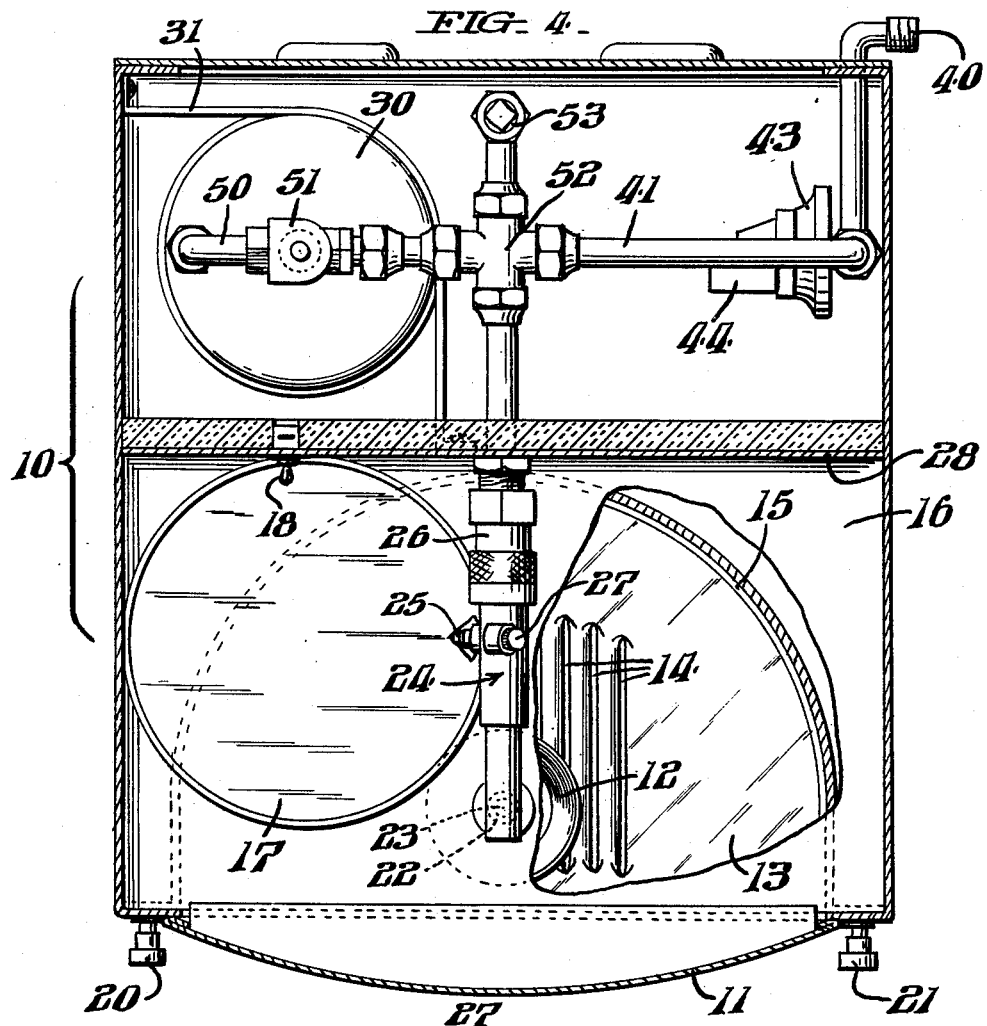
FIG. 4 is a cross sectional view partly broken away along the line IV—IV of FIG. 1.

The back potrion of cabinet 10 is separated from the front portion by means of separating wall 28. The back portion of cabinet 10 is illustrated in FIG. 2. A heating tank 30 is mounted on the side wall of cabinet 10 by means of bracket 31 and heating element 32 is disposed within tank 30. A thermostatic control switch 33 is connected to the heating unit 32. Tank 30 is also provided with a hot water safety valve 34 and an overflow tube 35 which drains overflow water to the drain plate 13 in the front portion of cabinet 10. Drain plate 13 is provided with an opening 19 which serves to drain the overflow from tube 35 to pan 15. Opening 19 also functions as a fingerhold for removing drain plate 13 from the cabinet 10. The water used in the drink dispenser is obtained from an ordinary water outlet through cold water inlet 40. The water passes through cold water line 41 on which is mounted strainer 42, pressure regulator 43 and cold water solenoid valve 44. A parallel water circuit is maintained through hot water tank 30 by means of tank inlet tube 45 which is connected to cold water line 41 at the T-plug 46. The heated water is drawn from hot water tank 30 through outlet tube 50 on which is mounted a hot water solenoid valve 51. Hot water tube 50 is joined to cold water line 41 at the juncture 52 and the two water lines flow into the common hot and cold water line 26 which passes through partition 28 to the front portion of cabinet 10. A backup reservoir 53 is maintained on the hot and cold water line 26 in the rear portion of cabinet 10 and its operation will be hereinafter more fully described.

The electrical power required for the operation of the hot water tank and the several electrical switches is derived through power line 54.

Figure 5:
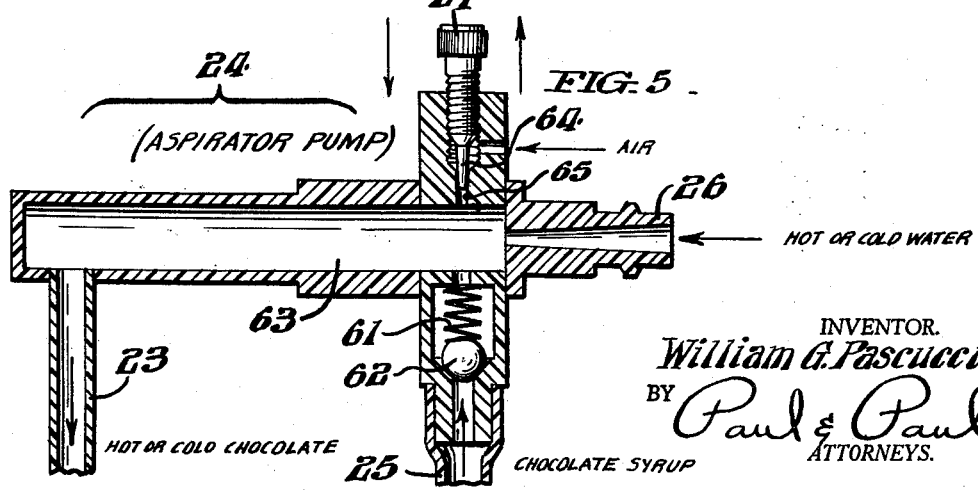
FIG. 5 is a fragmentary cross sectional view of an aspirator pump used in the drink dispenser of FIG. 1.

The mixing of hot or cold water and the flavored concentrate takes place in the aspirator pump 24 illustrated in FIG. 5. By the term "aspirator pump" is meant any device of the type shown which utilizes the flow of hot or cold water to draw a fluid into admixture therewith in predetermined proportions. In the aspirator pump shown, the hot or cold water inlet tube forms a nozzle at its juncture with the concentrate tube 25. The concentrate tube 25 is immersed in the flavored concentrate and is provided at its upper end with a spring loaded ball valve comprising spring 61 and ball 62. It will be apparent that the flow of hot or cold water above the upper end of concentrate tube 25 will cause a reduction in pressure at that point, drawing the ball 62 away from the adjacent opening in tube 25 against the resistance of spring 61. The reduction in pressure caused by the flow of hot or cold water will then cause the flavored concentrate to rise in tube 25 as shown by the arrow in FIG. 5 and to continue upward until it joins the hot or cold water in the main barrel 63 of aspirator pump 24. The mixture of concentrate and water then proceeds out of the aspirator pump 24 through tube 23. The ratio of flavored concentrate to water is controlled by means of the needle valve 64 mounted in opening 65 in barrel 63. By withdrawing the needle valve 64 more air is admitted to barrel 63 thereby reducing the effectiveness of the vacuum at the upper end of tube 25 and consequently reducing the amount of chocolate for a fixed amount of water. Conversely when the needle valve 64 is lowered into the opening 65, the amount of air admitted to barrel 63 is decreased, increasing the suction at the upper end of tube 25 and increasing the amount of chocolate for a given amount of water. The needle valve is raised or lowered by rotation of the screw 27. Other factors may be varied to change the mixture characteristics of the aspirator pump such as the dimensions of the various openings, the tension of spring 61 or the pressure of hot or cold water. But it has been found preferable to fix these characteristics and control the mix ratio by means of the admission of air to the barrel 63 as illustrated and described.

The operation of the drink dispenser of the invention is illustrated in FIG. 6. In using the drink dispenser the unit is connected to a power line 54 and a cold water source 40. The strainer 42 is provided to prevent the entry of foreign objects into the system and a pressure regulator 43 is provided to regulate the basic water pressure in the dispenser. In utilizing the dispenser the pressure regulator 43 is set at a desired pressure. The thermostat switch 33 on hot water tank 30 is then regulated to a desired hot water temperature. The main heater switch 18 is closed, placing the heater 32 and thermostat switch 33 in the main power line 54. The heater 32 then functions to heat the water in tank 30 to the desired temperature which has been set on thermostat 33. When the desired temperature is reached, thermostat switch 33 opens the circuit thus turning off the heater 32. The heater 32 and switch 33 thus function continuously to maintain the water in tank 30 at a substantially fixed temperature.

A container 17 of flavored concentrate, such as chocolate syrup, is placed in the upper front portion of cabinet 10 with syrup tube 25 immersed in the fluid. The control screw 27 on the aspirator pump is set at a desired position to fix the ratio of water to concentrate and a receptacle 12 is placed below the dispensing tube 22.

If a cold chocolate drink is desired the cold water switch 20 is closed. As is evident from the circuit diagram illustrated in FIG. 6, the closing of cold water switch 20 opens the cold water solenoid valve 44 on cold water line 41. The hot water solenoid valve 51 on hot water tube 50 remains closed. Cold water will thus flow through cold water line 41 and the outlet water line 26 through aspirator pump 24 where it is mixed with the chocolate syrup and the mixture is then delivered to the receptacle 12 through dispensing tube 22. While the water is flowing through cold water line 41, a certain amount is forced up into reservoir tube 53. When the receptacle 12 is filled, the cold water switch is opened by releasing button 20, thus closing cold water solenoid valve 44 and stopping the further flow of water through cold water line 41. However, the small amount of water retained in reservoir 53 drains out through water line 26 at relatively low pressure so that no flavored concentrate is drawn into aspirator pump 24 and this small amount of water passes out through dispensing tube 22 providing an effective cleansing agent after each use of the dispensing unit.

When a hot drink is desired the hot water switch 21 is closed thereby opening the hot water solenoid valve 51 while the cold water solenoid valve 44 remains closed. The passage of hot water through the outlet tube 26, aspirator pump 24 and dispensing tube 22 is the same as in the case of the cold water.

The drink dispenser of the invention is adaptable to other uses than those specifically shown. As one example, by preventing the inclusion of flavored concentrate in the system through aspirator pump 24 the dispenser could be caused to deliver hot water alone for use with instant coffee or tea or the like. It will also be apparent that time relays could be applied to the hot and cold water switches which would regulate the time delivery which the dispenser operates each time the button is pressed and thus control the amount of the drink dispensed on each occasion.

While the preferred embodiment of this invention has been described in some detail, it will be obvious to one skilled in the art that various modifications may be made without departing from the invention as hereinafter claimed.

Having thus described my invention, I claim:

1. A drink dispenser comprising a water inlet tube, aspirator pump means for combining a flavored concentrate with water in a predetermined ratio, concentrate tube means for delivering a flavored concentrate to said aspirator pump means, dispensing tube means for delivering a mixture of water and flavored concentrate from said aspirator pump to a receptacle, a hot water circuit operatively connecting said cold water inlet means and said aspirator pump including water heating means for heating the water passing therethrough to a predetermined temperature and hot water solenoid valve means for controlling the flow of hot water through said hot water circuit to said aspirator pump, a cold water circuit hydraulically in parallel with said hot water circuit connecting said cold water inlet means and said aspirator pump including a cold water solenoid valve means for controlling the flow of water through said cold water circuit, hot water switch means for opening said hot water solenoid valve means and simultaneously maintaining said cold water solenoid valve means closed and cold water switch means for opening said cold water solenoid valve means and simultaneously maintaining said hot water solenoid valve means closed.

2. The drink dispenser of claim 1 wherein the water heating means comprises a tank having a safety valve connected therewith and an overflow drain tube and a heating unit disposed therein, said heating unit being controlled by thermostatic switch means for maintaining a predetermined temperature in said tank.

3. The drink dispenser of claim 1 further comprising pressure regulator means operatively connected to said cold water inlet tube for regulating the pressure of water flowing therethrough.

4. The drink dispenser of claim 1 further comprising reservoir means for retaining a quantity of water during the operation of said drink dispenser and for releasing said quantity of water for flow through aspirator pump means and said dispenser tube means after the operation of said drink dispenser has stopped.

5. The drink dispenser of claim 1 wherein a drain plate is included in the bottom thereof positioned beneath the dispensing tube, said drain plate having means at the rear thereof for removing said drain plate and for draining the overflow water from said overflow drain tube.

References Cited in the file of this patent

UNITED STATES PATENTS

| 2,526,331 | Copping | Oct. 17, 1950 |
| 2,766,910 | Bauerlein | Oct. 16, 1956 |

FOREIGN PATENTS

| 569,843 | Canada | Feb. 3, 1959 |

UNITED STATES PATENT OFFICE
CERTIFICATE OF CORRECTION

Patent No. 3,007,609                         November 7, 1961

William G. Pascucci

It is hereby certified that error appears in the above numbered patent requiring correction and that the said Letters Patent should read as corrected below.

Column 4, line 42, after "through" insert -- said --.

Signed and sealed this 10th day of April 1962.

(SEAL)
Attest:

ERNEST W. SWIDER                         DAVID L. LADD
Attesting Officer                            Commissioner of Patents